United States Patent [19]
Faass et al.

[11] Patent Number: 5,868,991
[45] Date of Patent: Feb. 9, 1999

[54] METHOD FOR LOW TEMPERATURE INJECTION MOLDING OF HYDRODISINTEGRATABLE COMPOSITIONS

[75] Inventors: Judith Katherine Faass, Phoenix, Ariz.; Lee Kirby Jameson, Roswell; Bernard Cohen, Berkeley Lake, both of Ga.

[73] Assignee: Kimberly-Clark Worldwide, Inc., Neenah, Wis.

[21] Appl. No.: 687,860

[22] Filed: Jul. 26, 1996

[51] Int. Cl.$^6$ .................................................. B29C 45/00
[52] U.S. Cl. .............................. 264/328.16; 264/331.21
[58] Field of Search .............................. 264/328.1, 328.2, 264/328.14, 328.16, 328.17, 331.21

[56] References Cited

U.S. PATENT DOCUMENTS

| | | |
|---|---|---|
| 3,365,320 | 1/1968 | Minelli . |
| 3,526,538 | 9/1970 | Lindemann et al. . |
| 3,554,788 | 1/1971 | Fechillas . |
| 3,580,253 | 5/1971 | Bernardin . |
| 3,599,292 | 8/1971 | Ronzoni et al. . |
| 3,804,381 | 4/1974 | Bielfeldt et al. . |
| 3,882,869 | 5/1975 | Hanke . |
| 3,890,974 | 6/1975 | Kozak . |
| 3,952,347 | 4/1976 | Comerford et al. . |
| 4,028,290 | 6/1977 | Reid . |
| 4,063,995 | 12/1977 | Grossman . |
| 4,074,362 | 2/1978 | Kruder et al. . |
| 4,112,519 | 9/1978 | Kruder . |
| 4,186,233 | 1/1980 | Krajewski et al. . |
| 4,200,558 | 4/1980 | Holst et al. . |
| 4,225,554 | 9/1980 | Kaplan . |
| 4,296,055 | 10/1981 | Harris . |
| 4,404,161 | 9/1983 | Bier . |
| 4,410,571 | 10/1983 | Korpman . |
| 4,454,055 | 6/1984 | Richman et al. . |
| 4,518,721 | 5/1985 | Dhabhar et al. . |
| 4,534,767 | 8/1985 | Habib . |
| 4,578,065 | 3/1986 | Habib . |
| 4,591,467 | 5/1986 | Kopernicky . |
| 4,627,949 | 12/1986 | Dhein et al. . |
| 4,636,084 | 1/1987 | Kopernicky . |
| 4,636,085 | 1/1987 | Kopernicky . |
| 4,655,840 | 4/1987 | Wittwer et al. . |
| 4,728,325 | 3/1988 | Spiller . |
| 4,784,814 | 11/1988 | Diethelm et al. . |
| 4,794,034 | 12/1988 | Nishizawa et al. . |
| 4,806,337 | 2/1989 | Snipes et al. . |
| 4,861,539 | 8/1989 | Allen et al. . |
| 4,913,517 | 4/1990 | Arroyo et al. . |
| 4,963,312 | 10/1990 | Muller . |

(List continued on next page.)

FOREIGN PATENT DOCUMENTS

| | | |
|---|---|---|
| 2005764 | 6/1990 | Canada . |
| 042259 A1 | 12/1981 | European Pat. Off. . |
| 0164197 A3 | 12/1985 | European Pat. Off. . |
| 0378940 A1 | 7/1990 | European Pat. Off. . |
| 489967 A1 | 6/1992 | European Pat. Off. . |
| 499672 A1 | 8/1992 | European Pat. Off. . |
| 585906 A2 | 3/1994 | European Pat. Off. . |
| 62-141008 | 12/1987 | Japan . |
| 63304082 | 12/1988 | Japan . |
| 3020364 | 1/1991 | Japan . |
| 3095211 | 4/1991 | Japan . |
| 5086344 | 4/1993 | Japan . |
| 405212722 | 8/1993 | Japan . |
| 6057059 | 3/1994 | Japan . |
| 1379660 | 1/1975 | United Kingdom . |
| 2048078 | 12/1980 | United Kingdom . |
| 2246373 | 1/1992 | United Kingdom . |

OTHER PUBLICATIONS

*Absorbent Polymer Technology*, Lisa Bronnon–Peppas and Ronald S. Harland (eds.), Elsevier, pp. 3–22, Sep., 1990.

BF Goodrich Specialty Polymers & Chemicals Division, *Hystretch® Elastomer Emulsions*, Doc. No. MSDS90.534, Nov. 2, 1990.

*Eastman AQ® Polymers Properties and Applications*, Eastman Chemicals Publication No. GN–389B, pp. 2–27, May, 1990.

Hoechst Celanese Corporation, *Material Safety Data Sheet*, MSDS No. 1101750318, pp. 1–3, Feb. 7, 1992.

"Preparation and Use Composites Swellable by Water," *Chemical Abstracts*, vol. 114, No. 12, Abst. No. 114:10386m, Mar. 24, 1991.

"The Structure and Properties of Thixotropic Gels," *Chemical Abstracts*, vol. 30, No. 19, Oct. 10, 1936.

*Die Struktur und die Eigenschaften der thixotropen Gele*, VonB.S. Kandelaky, Kolloid Zeitschrift, V. 74, pp. 200–205, Feb., 1936.

*Principles of Colloid and Surface Chemistry*, Paul C. Hiemenz, 2nd ed., Marcel Dekker, Inc., pp. 782–783, Dec., 1985.

*Kirk–Othmer Encyclopedia of Chemical Technology*, 3rd ed., vol. 5, pp. 118–163, John Wiley & Sons, N.Y.–Chester–Brisbane & Toronto, Mar., 1979.

*Kirk–Othmer Encyclopedia of Chemical Technology*, 3rd ed., vol. 21, pp. 492–505, John Wiley & Sons, N.Y.–Chester–Brisbane & Toronto, Mar., 1983.

*The Condensed Chemical Dictionary*, 10th ed., Gessner G. Hawley, Van Nostrand Reinhold Co., N.Y., p. 838, est. Jul.–Aug., 1981.

(List continued on next page.)

Primary Examiner—Jan H. Silbaugh
Assistant Examiner—Kenneth M. Jones
Attorney, Agent, or Firm—Nancy M. Klembus; Joseph P. Harps

[57] ABSTRACT

Disclosed is a method for injection molding certain hydrodisintegratable materials which, when injection molded to form a desired object, acquire and maintain the desired shape. The method includes the steps of maintaining extrusion temperatures of the hydrodisintegratable material at or below about 250 degrees F. and maintaining the temperature of the mold at or below about 55 degrees F. In the presence of water, the molded object has the ability to rapidly disintegrate and disperse when subjected to standardized agitation testing.

12 Claims, No Drawings

U.S. PATENT DOCUMENTS

| | | |
|---|---|---|
| 5,002,526 | 3/1991 | Herring . |
| 5,013,769 | 5/1991 | Murray et al. . |
| 5,026,589 | 6/1991 | Schechtman . |
| 5,034,177 | 7/1991 | Niimi et al. . |
| 5,056,960 | 10/1991 | Marienfeld . |
| 5,082,655 | 1/1992 | Snipes et al. . |
| 5,190,712 | 3/1993 | Oishi et al. . |
| 5,219,941 | 6/1993 | Meyer, Jr. et al. . |
| 5,225,489 | 7/1993 | Prevorsek et al. . |
| 5,248,720 | 9/1993 | Deguchi et al. . |
| 5,300,358 | 4/1994 | Evers . |
| 5,316,712 | 5/1994 | Ono et al. ............... 264/328.16 |
| 5,317,037 | 5/1994 | Golden et al. . |
| 5,318,552 | 6/1994 | Shiba et al. . |
| 5,322,878 | 6/1994 | Deibig et al. . |
| 5,342,686 | 8/1994 | Guersen et al. . |
| 5,378,751 | 1/1995 | Deibig et al. . |
| 5,389,068 | 2/1995 | Keck . |
| 5,444,113 | 8/1995 | Sinclair et al. . |
| 5,466,518 | 11/1995 | Isaac et al. . |
| 5,496,874 | 3/1996 | Faass et al. . |

OTHER PUBLICATIONS

*The Condensed Chemical Dictionary* 10th ed., Gessner G. Hawley, Van Nostrand Reinhold Co., N.Y., p. 14, est. Jul. 1981.

*The Condensed Chemical Dictionary*, 11th ed., Gessner G. Hawley, Van Nostrand Reinhold Co., N.Y., pp. 567–568, 1987.

*Polymer Yearbook 3*, Richard A. Pethrick, Harwood Academic Publishers, Chur–London–Paris–New York, p. 65, Sep., 1986.

Christine Geonkoplis, Transport Processes and Unit Operation pp 216–217, ©1983, 1993.

METHOD FOR LOW TEMPERATURE INJECTION MOLDING OF HYDRODISINTEGRATABLE COMPOSITIONS

FIELD OF THE INVENTION

The field of the present invention is that of improved processes for injection molding certain compositions.

BACKGROUND OF THE INVENTION

As was stated in prior U.S. patent application Ser. No. 07/997,797 filed on Dec. 29, 1992, in the names of Bernard Cohen, Lee Jameson and Robert Isaac, for many years the problem of waste disposal has plagued the industries which provide disposable diapers, incontinent garments and feminine care products. While much headway has been made in addressing this problem, one of the weak links has been the inability to create an economical plastic material which will degrade when exposed to natural environmental forces. In particular, those of skill in the art have long sought materials which have the ability to readily dissolve, disperse or disintegrate in water. See, for example, U.K. patent disclosure 2,246,373, U.S. Pat. No. 4,186,233 and European Patent Application Number 0 585 906 A2. Without such a material the ability of the user to dispose of a product by flushing it down the toilet is controlled by the physical geometry of the product and the material handling capabilities of the sewage system and plants which will handle the product. Naturally, these constrictions greatly reduce, if not eliminate, the types of products which can be disposed of via toilet flushing. Furthermore, the ability of products such as disposable diapers, incontinent garments and feminine care products, to disintegrate in a landfill has been quite limited. This is because, historically, a large portion of the components of these products, which may well be biodegradable or photodegradable, are encapsulated in a plastic material which only degrades over a long period of time, if at all. Accordingly, if the plastic at least disintegrated in the presence of water, the internal components could degrade as a result of the rupture of the plastic encapsulation and their subsequent exposure to the forces of natural degradation.

The prior U.S. patent application, Ser. No. 07/997,797, discloses such a material and products formed thereby. The terminology used to describe such a material in that application was "hydrodisintegratable". For purposes of consistency, that terminology will also be adopted for use in the present application. The entirety of U.S. patent application Ser. No. 07/997,797 is hereby incorporated by reference.

One of the areas of interest for applications of such a material is, as was stated above, in feminine care items such as, for example, tampons. In some instances, women attempt to discard the rigid or semi-rigid jacket (typically called the applicator) that holds the tampon by flushing it down a toilet after the tampon has been inserted. Because tampon applicators typically are manufactured from a rigid or semi-rigid plastic material which, at best, only slowly degrades in the environment, this method of disposal has created at least two problems, both of which have plagued society for several years. First, such a method of disposal can lead to clogging of toilets or drain pipes. For this reason, many women, after having experienced a sewage line clogging, have refrained from this method of disposal. The second problem results from the resistance of the applicator to the degrading forces of nature whether they be physical or biological. Municipal waste treatment plants typically do nothing to degrade or otherwise alter the applicator. Accordingly, applicators are released into the environment by these plants in a generally non-degraded state. That is, they are readily recognizable as tampon applicators. Such released applicators show up on the banks of rivers and streams and even are deposited by ocean currents and tides. Of course, those applicators that do find their way to a landfill do not readily degrade in that environment either. Naturally, this result is quite unacceptable from both environmental and aesthetic standpoints. Those of skill in the art have attempted to address these problems. See, U.S. Pat. No. 5,389,068 entitled "Tampon Applicator" in the name of Laura E. Keck.

In conducting additional work with the material disclosed in U.S. patent application Ser. No. 07/997,797, it was discovered that the material generally disclosed therein, while quite satisfactory for use in, for example, film formation, exhibited distinct shortcomings when attempts were made to injection mold the material into shaped products. Typically, the material either: (1) assumed a physical, that is geometrical, configuration which did not satisfactorily conform to that desired by, for example, curling or otherwise physically deforming; or (2) became quite brittle and thus was too fragile to form a satisfactory commercial product.

Prior U.S. Pat. No. 5,496,874 entitled "Moldable Hydrodisintegratable Material and Products Formed Thereby" which was issued on Mar. 5, 1996 in the names of Judith Katherine Faass, Lee Kirby Jameson, Bernard Cohen and Lamar Heath Gipson described a solution to this problem. That solution was directed to limiting the amount of volatile materials present in the material to be injection molded to certain ranges. If the total amount of volatile materials present within the injection molded material is maintained within these ranges, a properly molded hydrodisintegratable material can be obtained. The entirety of U.S. Pat. No. 5,496,874 is hereby incorporated herein by reference. While the solution of U.S. Pat. No. 5,496,874 is satisfactory, it suffers from the limitation that the total amount of volatile materials which may be present in the injection molding composition must be monitored and maintained within the range described in that patent application. Those of skill in the art have sought methods which overcome this inherent limitation.

OBJECTS OF THE INVENTION

Accordingly, it is a general object of the present invention to provide a process for injection molding hydrodisintegratable materials where the amount of volatile materials present in the composition to be molded does not have to be controlled as strictly as with the aforementioned process.

Another object of the present invention is to provide a process for forming certain compositions which, when injection molded into a desired shape, are hydrodisintegratable.

Yet another object of the present invention is to provide a process for injection molding hydrodisintegratable compositions where the temperature of the extrudate is maintained at or below a critical temperature.

A further object of the present invention is to provide a process for injection molding hydrodisintegratable compositions where the mold used to form the compositions into a desired shaped article is maintained at or below a critical temperature.

Yet a further object of the present invention is to provide satisfactorily injection molded hydrodisintegratable articles formed by these processes.

Still further objects and the broad scope of applicability of the present invention will become apparent to those of skill in the art from the details given hereinafter. However, it should be understood that the detailed description of the presently preferred embodiment of the present invention is given only by way of illustration because various changes and modifications well within the spirit and scope of the invention will become apparent to those of skill in the art in view of the following description.

DEFINITIONS

As used herein, the term "xerogellant" refers to a material which, when in a substantially dry state, has the ability to spontaneously imbibe at least about twenty (20) times its own weight in aqueous fluid, for example, tap water. The xerogellant should have the ability to generally retain its original identity after it has imbibed the fluid. For example, a bead, fiber or film formed from a xerogellant will still be recognizable as such after having imbibed the fluid. The xerogellants suitable for use in the present invention are starch grafted sodium polyacrylates. Exemplary starch grafted sodium polyacrylates are available from Hoescht Celanese under the trade designation Sanwet. For example Sanwet IM-5000.

As used herein, the term "water dispersible polymer" refers to a polymeric material which is capable of forming a dispersion in an aqueous fluid, for example, tap water, at ambient temperature. The water dispersible polymers suitable for use in the present invention are relatively high molecular weight amorphous polyesters having one or more ionic substituents attached thereto. These relatively high molecular weight amorphous polyesters disperse directly in water without the assistance of organic cosolvents, surfactants, or amines. This water dispersibiity is attributable, in large part, to the presence of ionic substituents attached to the polymer chain, illustrated below.

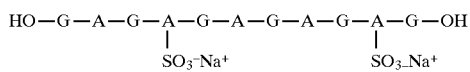

where:
A=an aromatic dicarboxylic acid moiety
G=an aliphatic or cycloaliphatic glycol residue
—OH=hydroxy end groups While only two of the aromatic dicarboxylic acid moieties shown above have sodiosulfo ($SO_3^-Na^+$) substituents, on the average, there are five to eight ionic sodiosulfo substituents per molecule.

This type of polymer is available from the Eastman Chemical Co. under the trade designation Eastman AQ. In particular, Eastman AQ 55 and AQ 38. A "S" or "D" suffix following the number indicates that the polymer is in either a dispersed or solid form. The number refers to the dry glass transition temperature, in degrees Centigrade, of the polymer.

The term "relatively high molecular weight amorphous polyesters having one or more ionic substituents attached thereto" refers to materials having an approximate average molecular weight (Mn) of at least about 14,000.

As used herein, the term "hydrodisintegratable" refers to a material which, when subjected to the "hydrodisintegration test", disintegrates into a particulate form where no individual particle is readily apparent to the unaided eye within a time period of about three (3) hours or less. Particles of this size generally have a maximum largest dimension of less than about one (1) millimeter.

As used herein, the term "hydrodisintegration test" refers to a test procedure where a molded object having a size of about three (3) millimeters by about five (5) millimeters by about thirteen (13) millimeters is placed into a 150 milliliter beaker holding 140 milliliters of tap water with a pH of about 7 and which is maintained at room temperature and pressure. The water and object are stirred with a magnetic bar using a Nuvona Stir Plate model SP18425 (Thermolyne Company, Dubuque, Iowa) at a speed setting of 6. The time required for the object to disintegrate to a predetermined particle size is noted. Unless otherwise noted, the hydrodisintegration test time is the time it takes the block of material to disintegrate to a particle size where the largest dimension of the particle is less than about one (1) millimeter.

As used herein the term "a material which satisfactorily conforms to the desired physical configuration upon being molded" is meant to refer to a material which, when subjected to the temperatures and pressures of a molding operation, for example an injection molding process, is able to perform the function for which it was intended. It is recognized that few items exactly conform to the physical configuration of the mold. All that is necessary is for the molded product to satisfactorily perform its intended function.

SUMMARY OF THE INVENTION

In response to the foregoing difficulties which were experienced in attempts to injection mold hydrodisintegratable materials, we have developed a process for injection molding a composition which, when molded, is hydrodisintegratable. The molded article conforms satisfactorily to the desired mold configuration and releases easily from the mold. This new process involves the steps of extruding a blend which includes (a) a relatively high molecular weight amorphous polyester having one or more ionic substituents attached thereto; (b) a starch grafted sodium polyacrylate; and (c) glycerin at a temperature of no greater than about 250 degrees F. into a mold maintained at a temperature of no greater than about 55 degrees F.

In some embodiments, the temperature at which the composition is maintained within the extruder is maintained within the range of from 200 to 250 degrees F. and the temperature at which the mold used to form the composition into a desired article is maintained within the range of from 35 to 55 degrees F.

In some embodiments, while the temperature of the blend within the extruder is generally maintained at or below 250 degrees F., the temperature of the mold into which the composition is to be placed for formation into a desired article will be maintained within the range of from 35 to 55 degrees F. For example, the temperature of the mold may be maintained within the range of from 40 to 50 degrees F. More particularly, the temperature of the mold may be maintained within the range of from 45 to 48 degrees F. Even more particularly, the temperature of the mold may be maintained within the range of from 46 to 47 degrees F.

In some embodiments, while the temperature at which the mold is maintained will generally be maintained at or below 55 degrees F., the temperature of the composition will be maintained within the range of from 200 to 250 degrees F. during the extrusion process. More particularly, the temperature of the composition may be maintained within the range of from 225 to 250 degrees F. during the extrusion process. Even more particularly, the temperature of the composition may be maintained within the range 235 to 245 degrees F. during the extrusion process. For example, the temperature of the composition may be maintained within the range 238 to 342 degrees F. during the extrusion process.

In some embodiments the blend will include from 7.5 to 85 weight percent of a relatively high molecular weight amorphous polyester having one or more ionic substituents attached thereto, from 7.5 to 85 weight percent of a starch grafted sodium polyacrylate and from 5 to 25 weight percent of glycerin. For example, the blend may include from 7.5 to 85 weight percent of a relatively high molecular weight amorphous polyester having one or more ionic substituents attached thereto, from 7.5 to 85 weight percent of a starch grafted sodium polyacrylate and from 10 to 25 weight percent of glycerin. More particularly, the blend may include from 7.5 to 85 weight percent of a relatively high molecular weight amorphous polyester having one or more ionic substituents attached thereto, from 7.5 to 85 weight percent of a starch grafted sodium polyacrylate and from 10 to 20 weight percent of glycerin. Even more particularly, the blend may include from 7.5 to 85 weight percent of a relatively high molecular weight amorphous polyester having one or more ionic substituents attached thereto, from 7.5 to 85 weight percent of a starch grafted sodium polyacrylate and from 10 to 15 weight percent of glycerin.

Importantly, the material, when molded by the application of heat and pressure, conforms substantially to the desired molded configuration and is not brittle. Additionally, the thus molded object retains the desired molded configuration while still having the ability to hydrodisintegrate in the presence of an agitated aqueous medium such as tap water. Thus, we have discovered that, when a hydrodisintegratable composition is formed from a blend of (a) a relatively high molecular weight amorphous polyester having one or more ionic substituents attached thereto; (b) a starch grafted sodium polyacrylate; and (c) glycerin, the temperature at which the composition is maintained at during extrusion as well as the temperature of the mold used to form the composition into a shaped article is critical to the ability of the material to retain the desired molded configuration without acquiring undesirable characteristics such as brittleness. Importantly, when this blend is used, in the process of the present invention, the amount of volatile materials present in the blend does not have to be strictly controlled and monitored as is the case with other blends.

DETAILED DESCRIPTION OF THE INVENTION

The moldable, hydrodisintegratable material of the present invention is formed by placing a starch grafted sodium polyacrylate xerogellant, desirably in powdered form, in an appropriately sized container and adding water so that the xerogellant is fully hydrated. While any starch grafted sodium polyacrylate may be used, exemplary materials may be obtained from the Hoechst Celanese Corporation under the trade designation Sanwet IM5000P. If the initial addition of water to the starch grafted sodium polyacrylate does not result in the consistency of the starch grafted sodium polyacrylate and water mixture being that of a liquid, additional water is added until such is the case.

At this time the water dispersible relatively high molecular weight amorphous polyester polymer having one or more ionic substituents attached thereto, glycerin, a plasticizing agent, are added to the hydrated, liquid mixture of starch grafted polyacrylate and water. Other plasticizing and processing agents may be added as desired. In some embodiments, the water dispersible relatively high molecular weight amorphous polyester polymer having one or more ionic substitutents attached thereto may be added to the mixture of water and hydrated starch grafted polyacrylate in the form of an aqueous dispersion.

While any water dispersible relatively high molecular weight amorphous polyester having ionic substituents attached thereto may be utilized, exemplary materials may be obtained from the Eastman Chemical Co. of Knoxville, Tenn., under the trade designation Eastman AQ. In particular, Eastman AQ 55 and AQ 38. Eastman literature, which describes these materials in more detail, is readily available to those of skill in the art.

While any source of glycerin is satisfactory, one exemplary source of glycerin is 96% USP grade glycerin which may be obtained from the Dow Chemical Company of Midlands, Michigan.

The resulting blend should include from 7.5 to 85 weight percent of a relatively high molecular weight amorphous polyester having one or more ionic substituents attached thereto, from 7.5 to 85 weight percent of a starch grafted sodium polyacrylate and from 5 to 25 weight percent of glycerin. For example, the blend may include from 7.5 to 85 weight percent of a relatively high molecular weight amorphous polyester having one or more ionic substituents attached thereto, from 7.5 to 85 weight percent of a starch grafted sodium polyacrylate and from 10 to 25 weight percent of glycerin. More particularly, the blend may include from 7.5 to 85 weight percent of a relatively high molecular weight amorphous polyester having one or more ionic substituents attached thereto, from 7.5 to 85 weight percent of a starch grafted sodium polyacrylate and from 10 to 20 weight percent of glycerin. Even more particularly, the blend may include from 7.5 to 85 weight percent of a relatively high molecular weight amorphous polyester having one or more ionic substituents attached thereto, from 7.5 to 85 weight percent of a starch grafted sodium polyacrylate and from 10 to 15 weight percent of glycerin.

The next step in the process is to extrude the blend, using conventional extrusion equipment, into a conventional injection mold. Importantly, it has been found that, in order to obtain an injection molded shaped article which satisfactorily conforms to the shape desired and does not possess other non-desirable attributes the temperature of the blend must be maintained at or below about 250 degrees F. while the blend is within the extruder. Additionally, it has been determined that the temperature of the injection mold should be maintained at or below about 55 degrees F. for satisfactorily molded articles to be attained. That is to say, both of these process parameters must be met for proper injection molding of the blend to be achieved.

In some embodiments, while the temperature of the blend within the extruder is generally maintained at or below 250 degrees F., the temperature of the mold into which the composition is to be placed for formation into a desired article will be maintained within the range of from 35 to 55 degrees F. For example, the temperature of the mold may be maintained within the range of from 40 to 50 degrees F. More particularly, the temperature of the mold may be maintained within the range of from 45 to 48 degrees F. Even more particularly, the temperature of the mold may be maintained within the range of from 46 to 47 degrees F.

Additionally, in some embodiments, while the temperature at which the mold is maintained will generally be maintained at or below 55 degrees F., the temperature of the composition will be maintained within the range of from 200 to 250 degrees F. during the extrusion process. More particularly, the temperature of the composition may be maintained within the range of from 225 to 250 degrees F. during the extrusion process. Even more particularly, the temperature of the composition may be maintained within the range 235 to 245 degrees F. during the extrusion process. For example, the temperature of the composition may be maintained within the range 238 to 242 degrees F. during the extrusion process.

In some embodiments it may be desirable to employ various additives such as antioxidants, antistatic agents, blowing agents, compatibilizers, flame retardants, heat stabilizers, impact modifiers, lubricants, ultraviolet stabilizers, processing aids, surfactants, dispersants, slip agents, mold release agents, etc., as fabricating agents or as modifiers depending on the specific properties which would be desirable to have in the final product.

The invention will now be described with respect to certain specific embodiments thereof.

EXAMPLES

A masterbatch of material was prepared using a co-rotating, intermeshing twin screw seven zone extruder manufactured from Werner & Pfleiderer Corporation of Ramsey, N.J. One of the hoppers of the twin screw extruder was filled with Eastman AQ38. The other hopper was filled with fines of powdered Hoechst Sanwet IM5000P. The fines are sold by Hoechst under the trade designation IM 5000F. A Neptune proportioning pump model #520-A-N3 manufactured by the Neptune Chemical Pump Co. of Lansdale, Pa. was assembled, in conventional manner, to supply liquid to zone 2 of the extruder. The Neptune pump was powered by a one-half horse power, 60 Hz, 1725 rpm General Electric pump. This arrangement has a maximum delivering capacity of 125 grams per minute. Because this is the rate limiting rate, all other proportions were calculated and based on this feed rate.

One thousand one hundred and five milliliters (1,105 ml.) of 96% glycerin was combined with 1,000 milliliters of water. The glycerin solution was mixed thoroughly and then pumped into the second zone of the extruder using the Neptune pump.

The feed rates of the two materials in the extruder hoppers were adjusted until rates of 50 grams per minute were obtained for each material. The feed rate setting for the pellets was 29 and the feed rate setting for the powder was 180.

These actions resulted in a calculated composition of 43.71%/43.71%/12.59% (Sanwet IM5000F/Eastman AQ38/glycerin).

The die was removed from the end of the extruder to allow for easier sample flow from the end of the barrel of the extruder.

The sample was then extruded as a 1.5 inch wide strip. At the time of sample collection, the following extruded conditions were recorded:

| Zone | 1/ | 2/ | 3/ | 4/ | 5/ | 6/ | 7 |
|---|---|---|---|---|---|---|---|
| Extruder Zone Temperatures (°C.): | 57/ | 87/ | 119/ | 122/ | 102/ | 100/ | 110 |

Screw Rpm: 100
Torque: 74–91%
Pressure: 210 pounds per square inch (psi) (no die)
Head Temp: 104 degrees Celsius
The injection molding was carried out on an Engel EC88 28 ton, 1.5 ounce shot size injection molding machine, model CG812SCSX. This machine is manufactured by the Engel Company of Guleph, Ontario, Canada. The machine was equipped with a mold designed to form a coaster for holding drink glasses. The mold had a gate size of 0.121 inch wide, 0.062 inch high and 0.056 inch long. The injection molded article which was formed had a generally circular shape having a 92 mm diameter with a thickness of 5 mm. A mold release material was employed. The mold release agent used was Stoner K206 silicone food grade mold release available from Stoner Chemicals Inc. of Quarryville, Pa. After molding, the system was purged using high density polyethylene (HDPE6007, available from M. Holland Company of Northbrook, Ill.). The HDPE6007 had a melt flow measured in accordance with ASTM D 569-90 of about eight (8).

Example 1

In order to demonstrate the criticality of maintaining the mold temperature at about 55 degrees F. or lower, a first group of injection molding runs was attempted. The first group of runs were conducted by injection molding of a portion of the masterbatch material at the following temperature/zone settings:

| Zone | 1 | 2 | 3 |
|---|---|---|---|
|  | 250° F. Nozzle | 250° F. Front Temp. | 225° F. Middle Temp. |

The injection molding was carried out at a pressure of 1,450 psi. The mold pressure was 300 psi. The mold temperature was 60 degrees F. and the release time was 14 seconds. The molded part obtained was very soft and would not release from the mold. The molded part had no rigidity. The run was repeated lowering the injection molding pressure to 700 psi. The results, however, were the same. The mold temperature was changed to 64 degree F. but the results still remained the same. The hold time (release time) was increased from 14 to 40 seconds and then to 60 seconds with no change in experimental results.

At this point the run was repeated at a mold temperature of 57 degrees F. and a 60 second hold time (release time). The injection pressure remained at 700 psi and the mold pressure remained at 300 psi. The Stoner mold release was utilized. The temperature/zone settings remained the same. A rigid part was formed which was easily removed from the mold.

Example 2

In order to demonstrate the further criticality of maintaining the extrusion temperature at about 250 degrees F. or lower, a second group of injection molding runs was attempted. The second group of runs was conducted by injection molding of a portion of the masterbatch material at the following temperature/zone settings:

| Zone | 1 | 2 | 3 |
|---|---|---|---|
|  | 300° F. Nozzle | 300° F. Front Temp. | 255° F. Middle Temp. |

The injection molding was carried out at a pressure of 700 psi. The mold pressure was 300 psi. The mold temperature was maintained at about 53 degrees F. and the hold (release) time was 60 seconds. The molded part produced was wet and slimy due to water which exited the part. The higher barrel temperature also caused material to stick to the screw. This experiment was repeated at an injection pressure of 600 psi with the same negative result.

While the invention has been described in detail with respect to specific preferred embodiments thereof, it will be appreciated that those skilled in the art, upon attaining an understanding of the foregoing, may readily conceive of alterations to and variations of the preferred embodiments. Such alterations and variations are believed to fall within the scope and spirit of the invention and the appended claims.

What is claimed is:

1. A process for injection molding a composition which, when molded, is hydrodisintegratable, the process including the steps of:

extruding a blend comprising a relatively high molecular weight amorphous polyester having one or more ionic substituents attached thereto, a starch grafted sodium polyacrylate and glycerin at a temperature of no greater than 250 degrees F. into a mold maintained at a temperature of no greater than about 55 degrees F.

2. A process for injection molding a composition which, when molded, is hydrodisintegratable, the process including the steps of:

extruding a blend comprising a relatively high molecular weight amorphous polyester having one or more ionic substituents attached thereto, a starch grafted sodium polyacrylate and glycerin at a temperature of from 200 to 250 degrees F. into a mold maintained at a temperature of from 35 to 55 degrees F.

3. A process for injection molding a composition which, when molded, is hydrodisintegratable, the process including the steps of:

extruding a blend comprising from 7.5 to 85 weight percent of a relatively high molecular weight amorphous polyester having one or more ionic substituents attached thereto, from 7.5 to 85 weight percent of a starch grafted sodium polyacrylate and from 5 to 25 weight percent of glycerin at a temperature of from 200 to 250 degrees F. into a mold maintained at a temperature of from 35 to 55 degrees F.

4. The process according to claim 3, wherein the blend comprises from 10 to 25 weight percent of glycerin.

5. The process according to claim 3, wherein the blend comprises from 10 to 20 weight percent of glycerin.

6. The process according to claim 3, wherein the blend comprises from 10 to 15 weight percent of glycerin.

7. The process according to claim 3, wherein the blend is extruded at a temperature of from 225 to 250 degrees F.

8. The process according to claim 3, wherein the blend is extruded at a temperature of from 235 to 245 degrees F.

9. The process according to claim 3, wherein the blend is extruded at a temperature of from 238 to 242 degrees F.

10. The process according to claim 3, wherein the mold is maintained at a temperature of from 40 to 55 degrees F.

11. The process according to claim 3, wherein the mold is maintained at a temperature of from 45 to 48 degrees F.

12. The process according to claim 3, wherein the mold is maintained at a temperature of from 46 to 47 degrees F.

* * * * *